United States Patent [19]

Thibaut

[11] Patent Number: 5,593,342
[45] Date of Patent: Jan. 14, 1997

[54] DEVICE FOR SMOOTHING AND POLISHING STONE

[75] Inventor: Bernard Thibaut, Vire, France

[73] Assignee: Thibaut S.A., Vire, France

[21] Appl. No.: 439,423

[22] Filed: May 11, 1995

[30] Foreign Application Priority Data

May 11, 1994 [FR] France .................................. 94.05791

[51] Int. Cl.$^6$ ..................................................... B24B 7/22
[52] U.S. Cl. ............................. 451/159; 451/41; 451/353
[58] Field of Search ................................. 125/25; 451/41, 451/53, 119, 120, 121, 135, 139, 158, 159, 162, 163, 211, 350, 353, 359

[56] References Cited

U.S. PATENT DOCUMENTS

| | | |
|---|---|---|
| 2,105,634 | 1/1938 | Brendel. |
| 2,582,470 | 1/1952 | Walker et al.. |
| 3,608,648 | 9/1971 | Dibble, Jr. et al. .................. 451/165 X |
| 4,965,965 | 10/1990 | Wallin et al. ............................. 451/159 |
| 5,161,331 | 11/1992 | Zambon et al. ......................... 451/159 |

FOREIGN PATENT DOCUMENTS

| | | |
|---|---|---|
| 0236865 | 9/1987 | European Pat. Off.. |
| 0242845 | 10/1987 | European Pat. Off.. |
| 800112 | 9/1950 | Germany. |
| 8808679 | 12/1988 | Germany. |
| 4224846 | 2/1994 | Germany. |

*Primary Examiner*—Timothy V. Eley
*Attorney, Agent, or Firm*—Young & Thompson

[57] ABSTRACT

A device for smoothing or polishing stone, of the type comprising at least two carrying segments for flat grindstones or bricks. These segments are driven with oscillatory movement so as to cause the grindstones or bricks to operate along a generatrix when the device is driven in rotation during smoothing or polishing. The drive for the flat grindstones (16) or bricks in oscillation comprises an intermittent flow or a continuous flow with variable flow rate, of a fluid, which can be a liquid or gas. The fluid flow can be a flow of water or of equivalent cooling liquid, so as to ensure simultaneously the lubrication in the course of polishing and the driving in oscillation of the carrying segments (12). A flexible jack (6) having at least one bellows fold is provided, as well as an elastic abutment (14) providing a spring, so as to cause to oscillate the carrying segments (12) between a first extended position of the flexible jack (6) and of compression of the elastic abutment (14), and a second retracted position of the flexible jack (6) and of elastic expansion of the abutment (14).

8 Claims, 3 Drawing Sheets

DEVICE FOR SMOOTHING AND POLISHING STONE

FIELD OF THE INVENTION

The present invention relates to a device for smoothing and polishing stone, for example granite or marble.

BACKGROUND OF THE INVENTION

There are known polishing heads sold under the mark BS6 by the French Company THIBAUT. These polishing heads, useful on machines with bridges and polishing line, comprise six carrying segments for flat grindstones usually called "bricks" by those engaged in this field. The six bearing segments are given an oscillating movement such as to cause the grindstones or bricks to operate along a generatrix when the polishing head is driven in rotation during smoothing or polishing. These known polishing heads comprise a coupling means to a machine for driving in rotation with a vertical or a horizontal axis and a means for securing the crown of the polishing head, so as to cause a drive cam to turn at a speed different from the speed of the polishing head and to create the mentioned oscillation of the flat grindstones or bricks.

These known devices are generally satisfactory, but have the drawback that the oscillation is caused by a complex mechanism that is costly to make: this mechanism of the alternating type in the BS6 heads can also as a modification be a planetary mechanism comprising satellites driven about a principal crown at a speed different from the speed of rotation of the head.

On the one hand, such mechanisms are costly to make, to install and to adjust with precision; on the other hand, the large diameter required by the presence of such mechanisms results in the production of heavy and cumbersome heads, permitting only the polishing of large surfaces.

OBJECTION OF THE INVENTION

The invention has for its object to overcome the mentioned drawbacks, by providing a new polishing or smoothing to device, whose design permits the production according to reduced diameters, adapted to permit polishing small surfaces, and whose oscillating mechanism is particularly simple and inexpensive to produce and install.

SUMMARY OF THE INVENTION

The invention comprise a smoothing or polishing device for stone, of the type comprising at least two bearing segments for flat grindstones or bricks, said segments being driven in oscillatory movement so as to cause the grindstones or bricks to Operate on a generatrix when the device is driven in rotation during smoothing or polishing, characterized in that the means for driving the flat grindstones or bricks in oscillation comprise an intermittent flow or a continuous flow with variable flow rate, of a fluid (liquid or gas).

According to other characteristics of the invention:

- the fluid flow is a flow of water or of equivalent cooling liquid, so as to ensure simultaneously the lubrication in the course of polishing and the driving in oscillation of the carrying segments;
- the device comprises a flexible jack having at least one undulation, as well as an elastic abutment forming a spring, so as to cause the bearing segments to oscillate between a first extended position of the flexible jack and of compression of the elastic abutment, and a second position of retraction of the flexible jack and of elastic expansion of said abutment;
- the flexible jack is secured to a shouldered pusher preventing the total retraction of the flexible jack and bearing simultaneously on one end of the carrying segment;
- the elastic abutment is a progressive abutment of elastomer or of the spring type;
- the carrying segments are shaped as mortises whose axis is oriented at an angle with the radial direction;
- the fluid flow is subjected to a constriction by reduction of cross section;
- the fluid flow is controlled in an adjustable manner by suitable means, particularly of the electrovalve type controlled by a timer or the like;
- the device is shaped as a substantially cylindrical chamber traversed by said fluid flow, provided with one end for mounting on the shaft for driving in rotation and provided with another end shaped as a support plate for the carrying segments;
- the support axes of the carrying segments are oriented substantially radially.

BRIEF DESCRIPTION OF THE DRAWINGS

The invention will be better understood from the description which follows given by way of non-limiting example with reference to the accompanying drawings, in which.

DETAILED DESCRIPTION OF THE INVENTION

Figure 1:
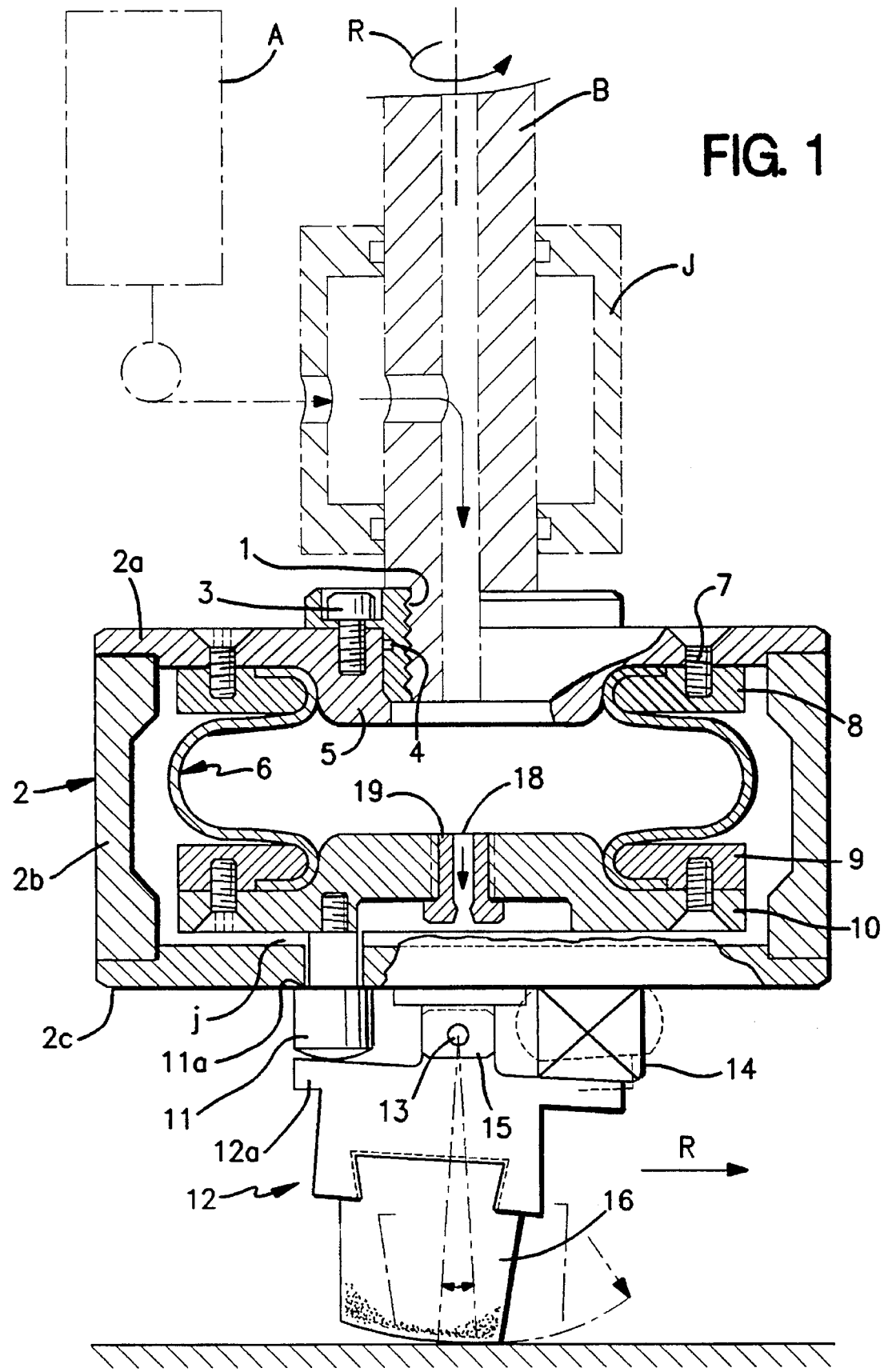
FIG. 1 is a schematic fragmentary radial crosssectional view of a device according to the invention.

With reference to FIGS. 1 to 4, a device according to the invention is driven in rotation R by a spindle shaft of a drive machine with a horizontal or a vertical axis. The connection of the device according to the invention to the drive machine is solely by the spindle shaft B shown schematically in broken lines, with no other connection for securing in rotation being necessary, as was the case with the prior art in which it was necessary to fix the principal crown so as to cause to turn the cam that generates the oscillation, at a speed different from the speed of rotation of the polishing head.

A fluid supply A, schematically shown in broken lines, injects fluid through a rotatable joint J of a type known per se and shown in broken lines, to the interior of the spindle shaft B, so as to produce a fluid flow substantially coaxial to the axis of rotation R of the device.

The device according to the invention is secured to the spindle shaft B by screw threads 1 or equivalent means to secured to the principal body 2 of the device, for example by screw 3, with a sealed mounting comprising a joint 4. The provision of separate screw threading 1 permits adaption and mounting of a device according to the invention on spindle shafts of different diameters.

The principal body 2 is shaped as a substantially cylindrical chamber, assembled from a flange 2a, a cylindrical crown 2b and a lower plate 2c assembled together for example by screws schematically shown by axes represented with broken lines. The upper flange 2a comprises a central bore receiving the screw threading or screw threaded nose 1 for adaptation on rotatable drive machines, as well as a radial internal configuration 5 ensuring a centering function of the flexible jack 6 having at least one undulation and made preferably of a material of elastomeric type, rubber or the like, and carries moreover securement means 7 of the screw type adapted to secure the upper plate 8 of the flexible jack 6 so as rigidly to connect the upper end of the flexible jack 6 to the flange 2a.

The flexible jack 6 comprises a lower retainer 9 mounted securely on an axially displaceable movable disc 10 by means of securements of the screw type. The movable disc 10 is spaced from the lower plate 2c with a predetermined play j comprised between 1 and 5 mm at rest and has a free stroke substantially coaxial to the axis of the device with a stroke displacement limited by abutments 11 preventing the total to retraction of the flexible jack 6 and bearing simultaneously on one end 12a of a carrying segment 12.

Each anti-retraction abutment 11 is screwed in the oscillating disc 10; it comprises a shoulder 11a coacting with the lower edge of a corresponding opening of the lower plate 2c of the body 2. Each carrying segment 12 is mounted oscillably about an axle 13, so as to oscillate between a first extended position of the flexible jack 6 corresponding to the compression of an elastic abutment 14 and a second retracted position of the flexible jack 6 and the elastic detent of the abutment 14. In the example in question, the anti-retraction abutment 11 is constituted as a finger bearing on one side of the carrying segment 12, while the elastic abutment 14 is mounted on the opposite side of the finger 11 relative to the oscillation axle 13. The oscillation axle 13 is mounted in a block 15 secured to the lower plate 2c of the body 2: thus, while the body 2 is driven with rotative movement R, the carrying segment 12 of the flat grindstone or brick 16 is driven with oscillatory movement about the oscillation axle 13 oriented preferably substantially radially relative to the axis R of driving in rotation.

Figure 2:
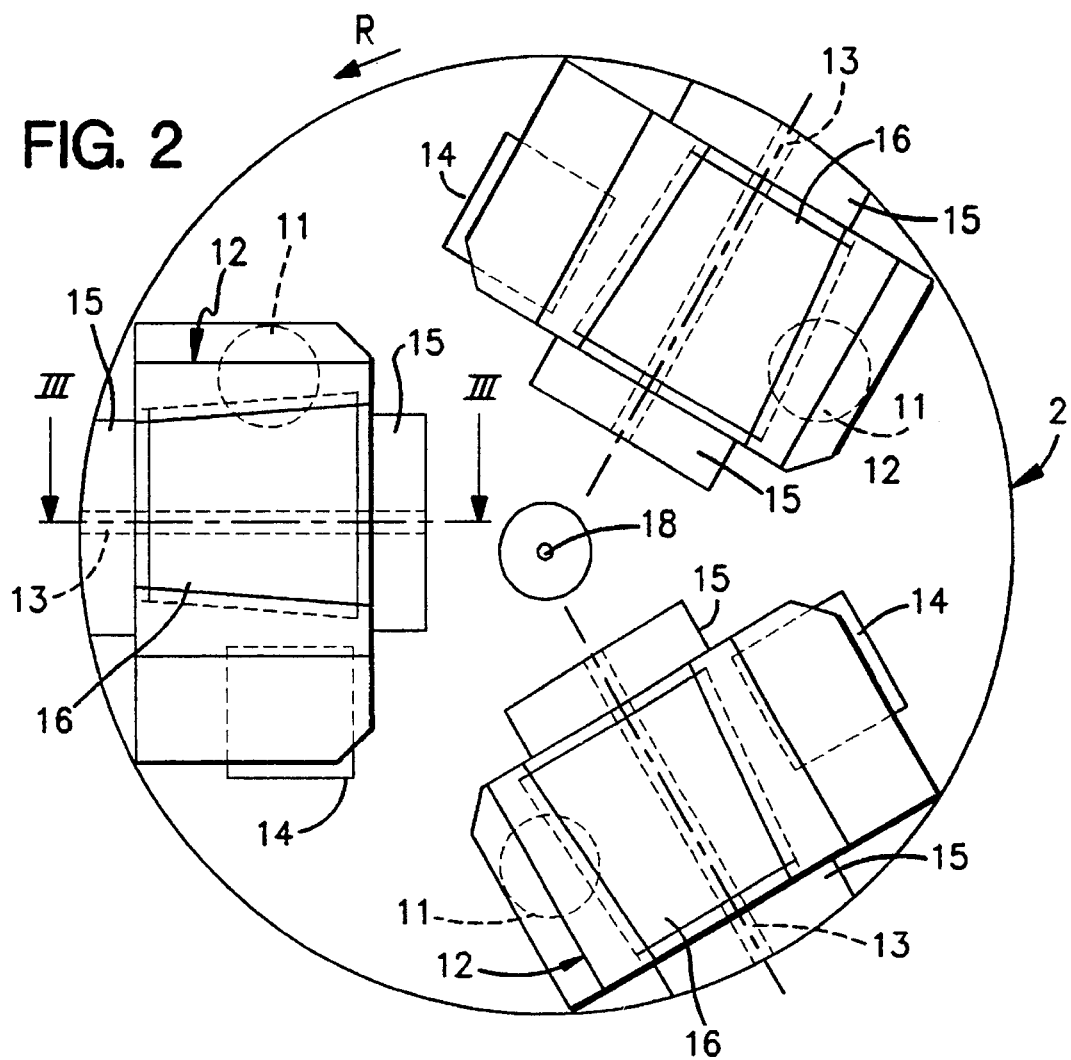
FIG. 2 is a schematic view from below of a device according to the invention.

FIG. 2 shows a device according to the invention, in which three carrying segments 12 are mounted oscillably under the action of fingers or abutments 11 and the counter resistance of the resilient abutments 14 about oscillation axles 13 oriented substantially radially. Of course, the devices comprising any number equal to or higher than two carrying segments are within the scope of the present invention.

The bricks 16 are mounted in the carrying segments 12 thanks to a mortise shape, for example dovetailed, which is radially outwardly constricted, such that the application of centrifugal force C engendered by rotation R tends to fix securely the bricks 16 to the carrying segments 12 by a wedging action.

Figure 3:
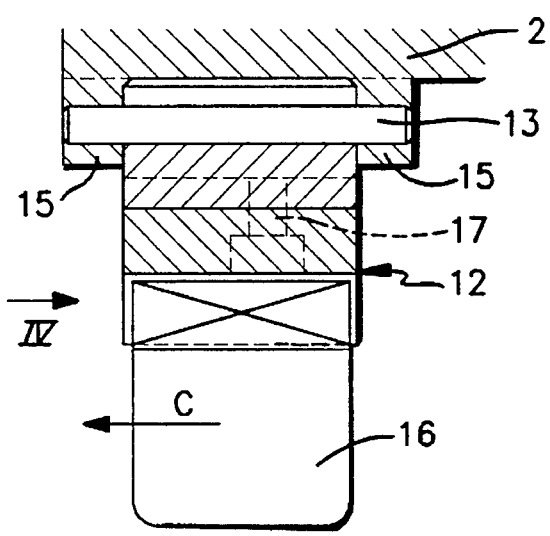
FIG. 3 is a schematic view in radial cross section on the line III—III of FIG. 2 of a carrying segment of a flat grindstone according to the invention.
Figure 4:
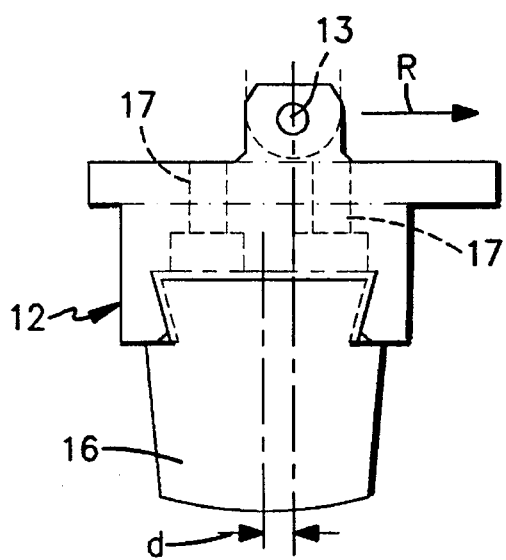
FIG. 4 is a schematic view in the direction of arrow IV of FIG. 3 of a carrying segment for a flat grindstone according to the invention.

The carrying segments 12 can be constituted by a single piece as in FIGS. 1 and 2, or alternatively can comprise a first portion constituted in the shape of an oscillating sole subjected to the counteraction of a finger or abutment 11 and of an elastic abutment 14, and a second portion forming a support for the flat grindstone 16 and having essentially the shape of a mortise: this second modification has the advantage of making it easy to dissociate the grindstone support from the oscillating sole by simply unscrewing the securement screws 17 shown in broken lines in FIGS. 3 and 4, which permits easily adapting all sizes of grindstones 16 to the mentioned oscillating soles.

The operation of the device according to the invention is as follows:

There is injected through supply A a fluid such as water, into the interior of the rotating drive shaft R, to fill the flexible jack 6, so as to give rise to alternating movement of this flexible jack 6, which gives rise to an axial displacement of the disc 10 and of the fingers or abutments 11, which when bearing on the soles of the carrying segments 12 exert on this latter an oscillating action whose elastic return is ensured by the abutments 14. By way of example, a supply A producing a water flow rate of 6 liters per minute at a relative supply pressure of 4 bars permits obtaining an operation of about 50 oscillations per minute of the carrying segments 12 and of the bricks 16. These results are obtained using as an elastic abutment 14 a progressive elastomeric abutment having a Shore A hardness of about 55 degrees.

The presence of a central opening 18 for restriction of the flow (a nozzle) in the case of water flow, has also the advantage of simultaneously ensuring the lubrication of the abrasive tools in the course of polishing and the pressure mounting of the jack 6.

A preferable way of obtaining intermittent fluid flow is to use an electrovalve disposed upstream and controlled by an adjustable timer according to a predetermined pattern of oscillation as desired, thus establishing an oscillatory pattern of pressure within the interior of the flexible jack 6.

Tests have shown that the device according to the invention is particularly adapted to the polishing or smoothing of granite, which is known to take place under very abrasive conditions prejudicing the lifetime of the movable mechanical members.

According to an improved modification of the invention, the axis of the grindstone or brick 16 is displaced by a predetermined distance from the axle of oscillation 13, to the rear in the direction of rotation, to facilitate the negative return of the carrying segment 12 subjected to counteractions of the finger or abutment 11 and of the resilient abutment 14. This arrangement trailing the direction of rotation R produces a disengaging effect which avoids chattering of the grindstones 16 on the surfaces to be polished. The predetermined distance d shown in FIG. 4 is preferably comprised between 5 and 25 mm, which provides improved results and a progressive shaping of the flat grindstone 16 along a substantially cylindrical surface, in which a single generatrix at a time is in contact with the material to be polished or smoothed. Moreover, in the case in which the jack 6 is continuously supplied, omitting the timing of the electrovalve, the jack 6 is continuously under pressure and in extended position, such that marble or other equivalent material can be polished for which no oscillation is necessary.

Figure 5:
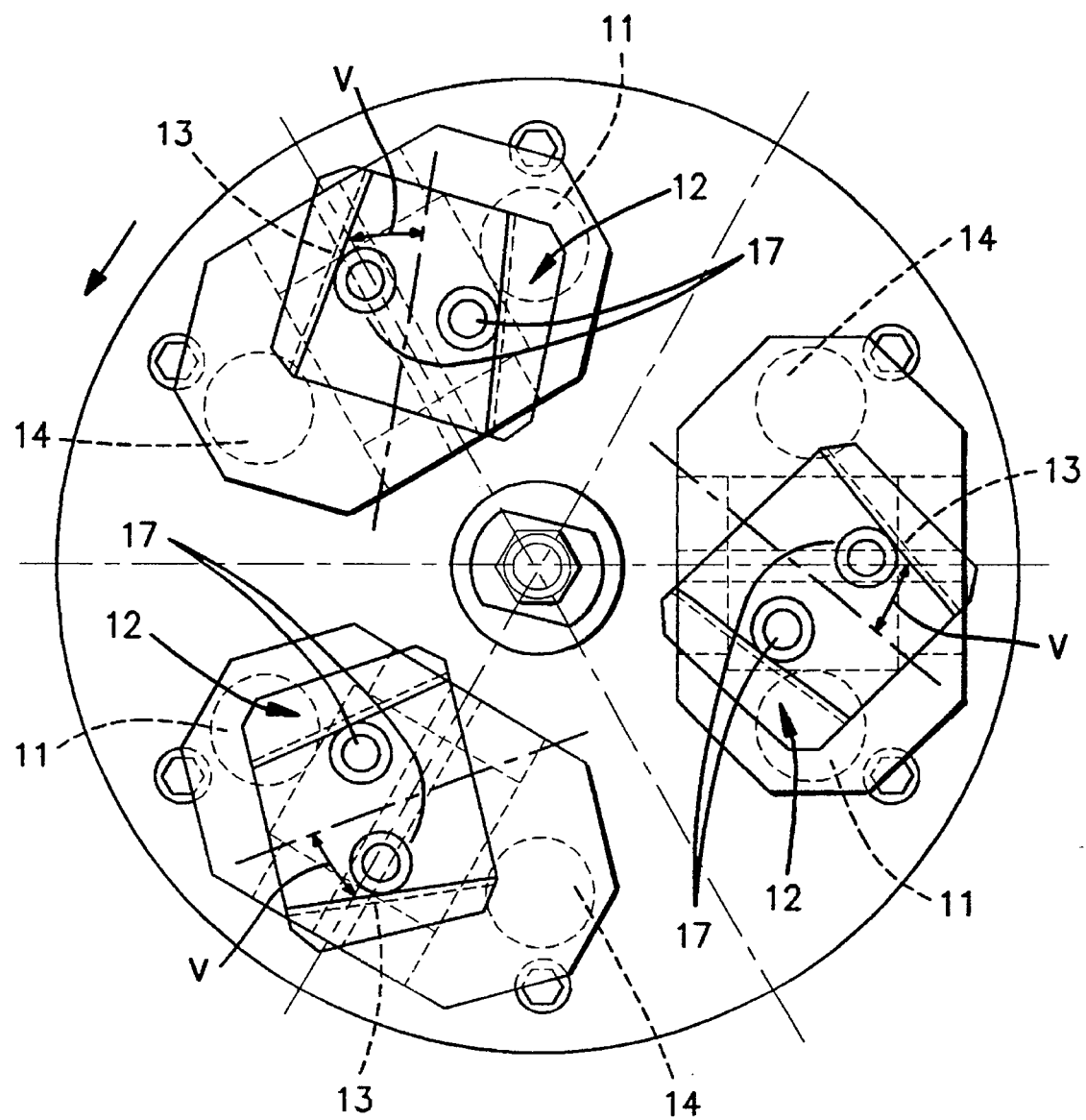
FIG. 5 is a schematic view from below analogous to FIG. 2 of another device according to the invention whose bricks have been removed.

Referring to FIG. 5, in which identical reference numerals are used as in FIGS. 1 to 4 designating identical or operationally equivalent elements, another device according to the invention comprises carrying segments 12 whose axis is directed at an angle V to the corresponding radial direction. Preferably, the angle V is about 45° in a preferred embodiment.

The orientation of the carrying sectors 12, and consequently of the grindstones 16 formed as bricks, at an angle V to the radial direction, has several advantages: this orientation considerably facilitates the assembly and disassembly of the grindstones 16 in the form of bricks and permits reducing the central space which is not subjected to the polishing action of the grindstones 16.

Tests show that the polishing and smoothing are practiced, thanks to the invention, in a gentler and more regular manner because of a progressive attack of the stone, and that the maneuverability of the device is substantially improved relative to the prior art.

The invention described with reference to a particular embodiment is not in any way limited, but covers on the contrary all modifications of shape and any variation of embodiment of the invention defined by the accompanying claims.

I claim:

1. In a device for smoothing or polishing stone, comprising at least two carrying segments for abrasive members, means to drive the device in rotation about an axis during smoothing or polishing, and means to drive said segments with oscillatory movement so as to cause the abrasive members to operate along a generatrix when the device is driven in rotation about an axis during smoothing or polishing; the improvement wherein the drive means for driving the abrasive elements in oscillation comprises means to create a variable flow of a cooling liquid, means responsive to the flow of cooling liquid to cause said oscillatory movement, and means thereafter to apply the same said cooling liquid to the stone, so as to ensure simultaneously lubrication in the course of abrading and the driving in oscillation of the carrying segments.

2. A device according to claim 1, wherein the device comprises a flexible jack (6) having at least one bellows fold, as well as an elastic abutment (14) so as to cause to oscillate the carrying segments (12) between a first extended position of the flexible jack (6) and of compression of the elastic abutment (14), and a second retracted position of the flexible jack (6) and of elastic expansion of said abutment (14).

3. A device according to claim 2, wherein the flexible jack (6) is secured to a presser finger (11) limiting retraction of the flexible jack (6) and bearing simultaneously on one end of a said carrying segment (12).

4. A device according to claim 1, wherein the carrying segments (12) are shaped as mortises with an axis oriented at an angle to the radial direction.

5. A device according to claim 1, wherein the fluid flow is subjected to a constriction (18).

6. A device according to claim 1, wherein the fluid flow is controlled in an adjustable manner by an electrovalve controlled by a timer.

7. A device according to claim 1, which is shaped as a substantially cylindrical chamber (2) traversed by said fluid flow, provided with one end (1) for mounting on a shaft for driving in rotation about said axis and provided with another end (2c) shaped as a support plate for the carrying segments (12).

8. A device according to claim 7, further comprising support axles (13) for the carrying segments (12) which are oriented substantially radially of said axis of rotation.

* * * * *